June 3, 1930.   W. C. DE ROO   1,761,107
RADIAL DRILL
Filed Oct. 13, 1927   3 Sheets-Sheet 1

Inventor
William C. De Roo,
By Murray and Gugelter
Attorneys

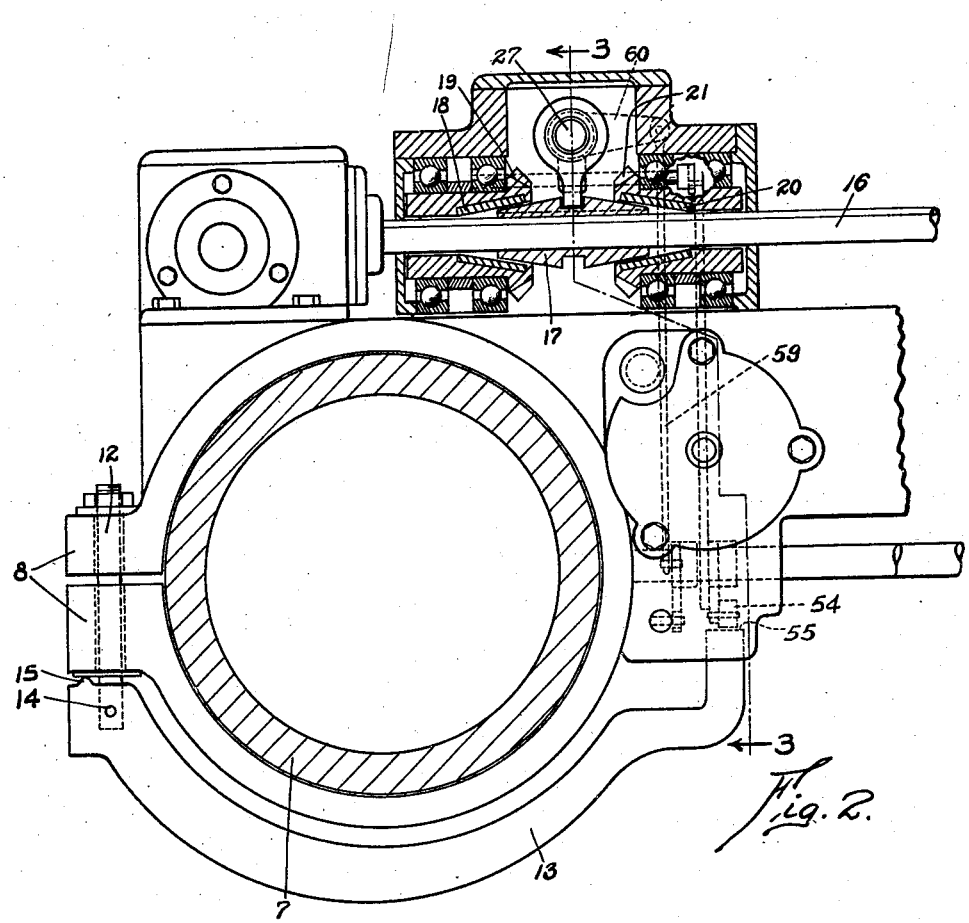

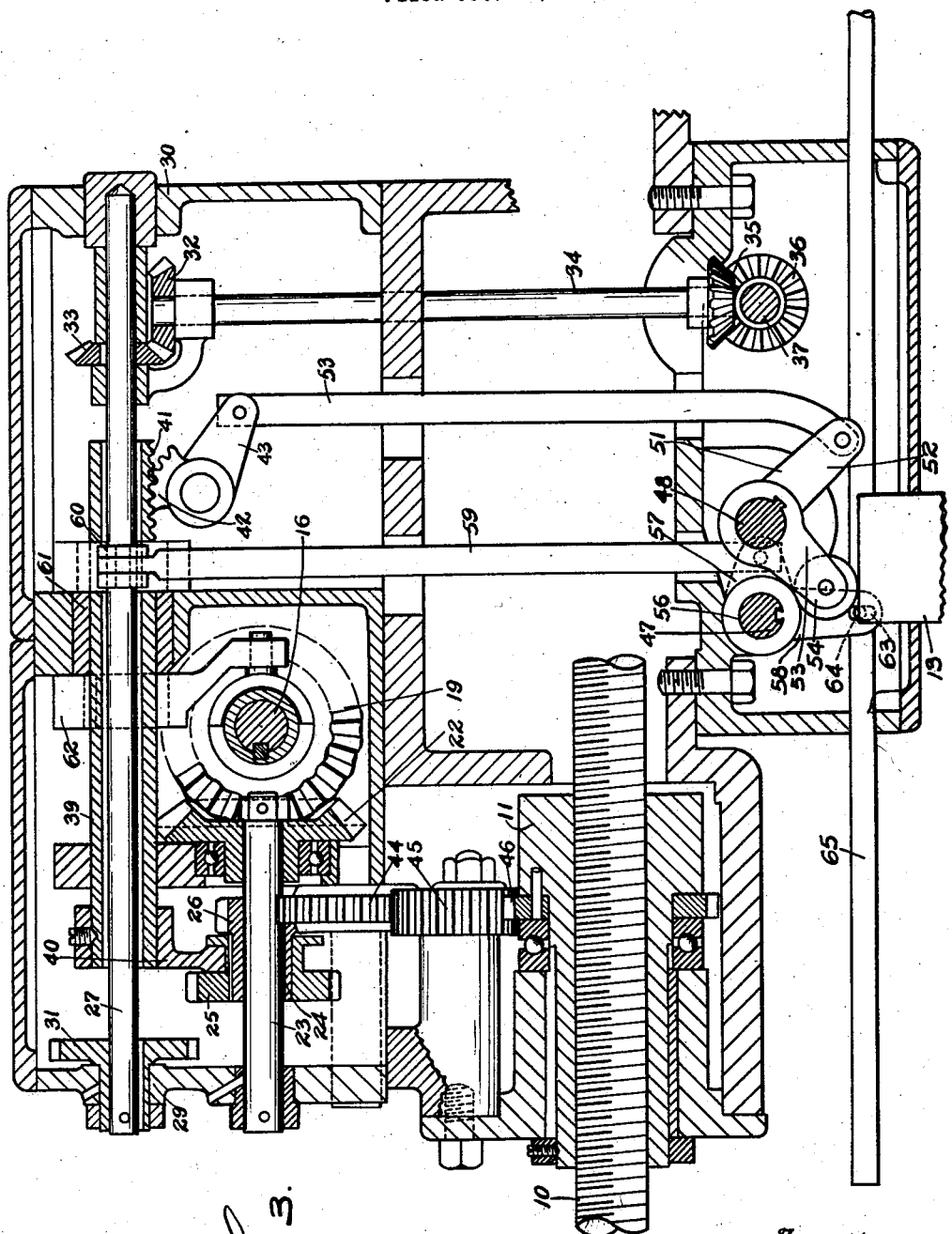

Patented June 3, 1930

1,761,107

UNITED STATES PATENT OFFICE

WILLIAM C. DE ROO, OF CINCINNATI, OHIO, ASSIGNOR TO THE FOSDICK MACHINE TOOL COMPANY, OF CINCINNATI, OHIO, A CORPORATION OF OHIO

RADIAL DRILL

Application filed October 13, 1927. Serial No. 226,028.

This invention relates to radial drills and especially to an instrumentality whereby complete control of all operative parts may be had from the drill head.

An object of the invention is to provide a mechanism whereby the arm elevating device cannot be actuated when the arm is clamped to the column.

Another object is to provide a single control lever whereby elevation and lowering of the arm is had and whereby the head is traversed along the arm.

Another object is to provide such mechanism as will render it impossible to at the same time actuate the arm and traverse the head along the arm.

Another object is to provide a structure whereby the arm is always clamped to the column when the head traverse is operative.

Another object is to provide a traverse mechanism for a radial drill head which is mounted in the arm and operated from the head.

These and other objects are attained by the means described herein and disclosed in the accompanying drawings, in which:

Fig. 2 is a view taken on line 2—2 of Fig. 1, part being shown in cross section.

Fig. 3 is a view on line 3—3 of Fig. 2 looking in the direction of the arrows.

Figure 1:
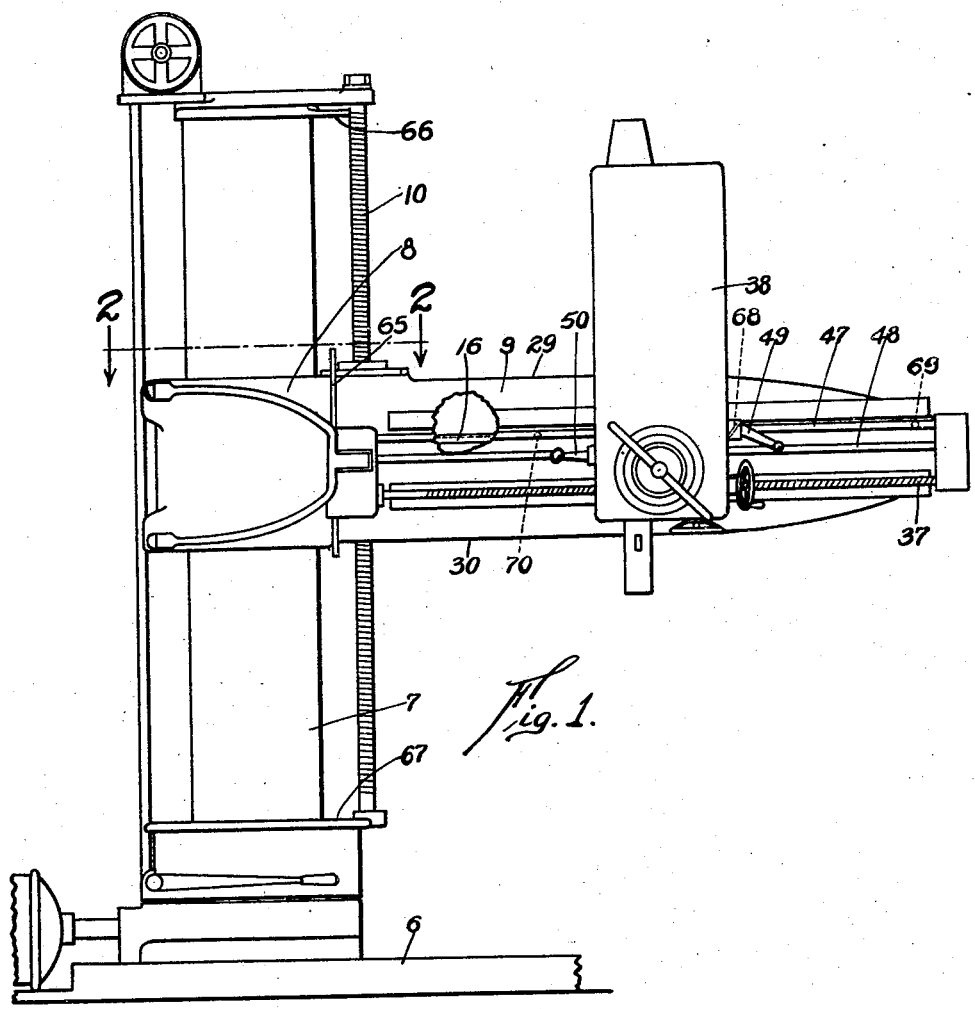
Fig. 1 is an elevational view of a radial drill having embodied therein the mechanism of the invention.

In the present invention the device comprises a base 6 of any approved construction from which extends a vertical column 7 which receives a split bearing 8 of a radial arm 9. A fixed elevating screw 10 is secured at its top and bottom in spaced relation to the column and extends through the drill arm 9 which has rotatably mounted therein a revoluble nut structure 11 adapted to be power-driven through a suitable transmission and controlled by means hereinafter described for raising and lowering the arm 9 on the column. The free ends of the split bearing 8 of the arm have a clamping bolt 12 extending therethrough and adapted to be clamped and loosened upon pivotal movement of the clamp arm 13 about its pivotal point 14 on the clamp bolt 12. The clamp arm has a fulcrum lug 15 which abuts one of the members of the split bearing 8 while movement of the clamp arm draws the other member of the split bearing toward it. Revolubly mounted in and extended longitudinally of the arm is a power shaft 16 adapted to be continuously driven from a suitable source of power. The power shaft 16 has splined thereon a double cone friction clutch member 17 (see Fig. 2) shiftable in opposite directions for engaging the complementary friction clutch member 18 provided with a bevel gear 19 or friction clutch member 20 provided with a bevel gear 21. The bevel gears 19 and 21 are constantly enmeshed with a bevel gear 22 which is secured in a drive shaft 23. The drive shaft 23 has splined thereon a shiftable unit 24 comprising a gear 25 and pinion 26. A head traverse shaft 27 is revolubly mounted at its opposite ends in the top 29 and bottom 30 of the arm and has secured thereto a gear 31 with which gear 25 on the drive shaft may engage thereby transmitting power through bevel gears 33—32, shaft 34 and bevel gears 35 and 36 to the head traverse screw 37. From the foregoing it will be apparent that when the gear unit 24 is shifted to engage with gear 31, the drill head 38 operatively connected with the traverse screw 37 will be moved across the drill arm in a direction determined by the frictional connection between the double cone friction drive with either of the gears 19 or 21. It will furthermore be noted that if the friction drive 17 be in intermediate or neutral position as shown in Fig. 2, no movement will be imparted to the drive shaft 23 and therefore the parts will remain stationary. The means for shifting the gear unit 24 comprises a tubular sleeve 39 slidable over the head traverse shaft 27 and having secured thereto yoke 40 which embraces the unit 24 between gears 25 and 26. The opposite end of the sleeve 39 has a rack 41 formed thereon which is in engagement with a pivotally mounted gear segment 42 having an integral arm 43.

By moving the arm 43 the gear segment 42 is rocked back and forth on its pivotal mounting and effects reciprocation of the sleeve 39 and hence the gear unit 24 for providing at one time a drive connection between shaft 23, gear 25 and gear 31 and at another time between shaft 23, gear 26 and gear train 44, 45 and 46 to impart rotation to the nut 11 operative over elevating screw 10. When in an intermediate position the gear unit 24 will be free of driving connection with either of the aforementioned parts. From this it will be noted that it is impossible for an operator to at the same time traverse the head and elevate or lower the arm.

In order to place the aforementioned control and also the other controls of the machine convenient to access by the operator, the arm 9 carries rods 47 and 48 which extend transversely thereof and through the head. Revolubly mounted on one side of the head and operatively receiving the rod 47 is a lever 49, while on the opposite side of the head is a revolubly mounted lever 50 which operatively receives rod 48. The rod 48 has a bell crank 51, the arm 52 of which connects with the arm 43 of gear segment 42 by a link 53 which has pivotal connections to said arms at its opposite ends. From the foregoing it will be readily apparent that by operating the lever 50 from the head (see Fig. 1) the operator may throw either the elevating nut 11 or the head traverse shaft 27 into driving connection with shaft 23. In order to automatically effect clamping of the arm 9 upon the column 7, when the head traverse is driven through shaft 23, the arm 53 of bell crank lever 51 is provided with a roller 54 which contacts the end 55 of clamp lever 13 so that upon rotation of shaft 48 forwardly by means of lever 50 the clamp lever 13 is first actuated to tighten the split bearing 8 whereupon further movement is translated through arm 52, link 53 and gear segment 42 into a longitudinal movement of sleeve 39 which results in meshing gear 25 with gear 31 on the head traverse drive. Likewise in shifting the gear unit 24 out of engagement with gear 31 and into driving engagement with the gear train connected with elevating nut 11, the roller 54 is moved away from the end 55 of clamp lever 13 upon initial movement of rod 48 thereby unclamping the arm on the column before geared engagement is effected to operate the elevating nut. In this way it is impossible for an operator to confuse movement of the operating parts with derogatory effect upon the machine. The rod 47 has a bell crank lever 56 having arms 57 and 58. The arm 57 has a link 59 connected thereto which in turn is pivotally connected to a rocker arm 60 fixed on a sleeve 61 which carries a rigidly mounted yoke 62 embracing the double cone friction clutch element 17. From the foregoing it will be readily apparent that by positioning the lever 49, the clutch element 17 may be shifted to driving connection with bevel gear 21 or with bevel gear 19 to impart rotation in opposite directions to the shaft 23 through its bevel gear 22. An intermediate position places the friction clutch member out of driving engagement with both of the gear elements and constitutes a neutral position in which no movement of parts can be had in the arm. The arm 58 of bell crank lever 56 has a slot 63 through which extends a pin 64 fixed to automatic stop bar 65. The stop bar 65 projects above and below the arm, and is adapted to abut upper and lower limit stops 66 and 67 in the event the arm 9 is raised or lowered beyond given limits while under power. Upon abutment of the stop bar 65 with either of the stops, the pin connection with arm 58 of bell crank lever 56 effects rotation of rod 47 which actuates link 59 to throw clutch member 17 into neutral position, thereby shutting off the drive and precluding damage to the machine by stopping the arm at its limit.

The operating mechanism in the drill head may be of any approved design, and since it forms no part of this invention need not be described herein.

From the foregoing description it will be apparent that each and every function of the entire machine is under complete control of the operator from his position at the drill head and that in the event of failure of the operator to give proper attention to any of the controls under any circumstances, the mechanism of the machine is absolutely protected by automatically operating safety stops and inter-lock connections as described. It will be understood that the position of the operating levers 49 and 50 may be reversed to the opposite sides of the head from the position shown in Fig. 1, if desired so that the rod 48 controlling the gearing transmission may be controlled by the right hand of the operator while the drive clutch 17 would be controlled by the left hand of the operator.

An efficient and inexpensive automatic limit stop for the head traverse is provided by forming a rearwardly extending inclined vane or fin 68 on the hub portion of control lever 49 and inserting studs 69 and 70 in the body of radial arm 29 in the path of said vane (see Fig. 1). The head 38 having lever 49 moving under power transversely across the arm will cause the inclined vane to abut the stops as the head reaches the limit of movement and will act as a cam to move the lever 49 from its raised or lowered operative position to a level or neutral position, thereby shutting off the traverse power feed.

The operation of the device is as follows.

If the power has been turned on and power shaft 16 is rotating, the lever 49 would normally be moved to neutral position so that no power is transmitted to any of the parts. The lever 50 may at the same time be left in an intermediate or neutral position wherein the arm would be lightly clamped and gears 25 and 26 of gear unit 24 would likewise be in a neutral position. If it be desired now to traverse the head along the arm the lever 50 would be moved downwardly, thereby effecting tight clamping of the arm on the column and at the same time shifting the sleeve 39 to effect meshing of gears 25 and 31. The lever 49 would then be actuated up or down in order to effect forward or reverse movement of bevel gear 22 and shaft 23 through a selected one of the gears 19 and 21. If the operator then desires to elevate or lower the arm, he must move lever 50 in the opposite direction, this movement resulting in releasing the clamp lever 13 from the influence of the roller 54 as the gear 25 is thrown out of mesh with gear 31. Subsequent movement of the lever results in meshing gears 26 with the gear trains 44—45 and elevating nut 11 at which time the arm is unclamped and the head traverse is out of driving connection with the shaft 23. It will be understood that the direction of movement of the arm along the column is controlled by the lever 49 as in the case of the head traverse. The direction of movement of the arm or of the head may at any time be thrown into neutral or immediate reverse by shifting the friction cone drive element 17 through the agency of lever 49. This makes it impossible to strip gears or threads or in any way damage the machine by reason of emergency reversals of the direction of operation of parts.

The elevating mechanism is also protected against accident by the stop rod 65 which encounters stops 66 and 67 at its upper and lower limits and actuates rod 47 to shut off the power drive.

The power head traverse is automatically rendered inoperative by means of the vane or cam 68 on the operating lever 49 engaging stops 69 or 70 to move rod 48 sufficiently to disengage gears 25 and 31.

It will be noted that all operations are conveniently under control of the operator from his position at the drill head and that the automatic controls safeguard against damage which may result from carelessness or absence of the operator.

What is claimed is:

1. In a radial drill the combination of a column, a radial arm movable on the column, a releasable clamp for fixing the arm on the column, an arm elevating mechanism, a head movable on the arm, a traverse mechanism for moving the head, a drive shaft carried by the arm, a transmission means controllable from the head to selectively connect the elevating mechanism and the traverse mechanism with the drive shaft, and an interlock connected with the transmission means whereby the clamp is released when the elevating mechanism is actuated and whereby the clamp is locked when the traverse mechanism is actuated.

2. In a radial drill the combination of a column, an arm movable on the column, a head movable on the arm, a drive shaft, a reversable clutch whereby the shaft may be selectively connected for rotation in opposite directions with the clutch and disconnected from the clutch, said clutch being operable from a rod disposed longitudinally of the arm, an automatic stop adapted to actuate said rod for disconnecting the clutch upon movement of the arm beyond predetermined limits, a hand lever splined on said rod and carried by the head for manually controlling the clutch, a second rod on the arm, an elevating mechanism, a head traverse means associated with the drive shaft and adapted to be shifted by oscillating the second mentioned rod for selectively connecting the drive shaft to the elevating mechanism and the traverse mechanism, a clamp for holding the arm against movement, and an arm on the second mentioned rod adapted to actuate the clamp when the traverse mechanism is operatively connected to the drive shaft and to release said clamp when the elevating mechanism is operatively connected to the drive shaft.

3. In a radial drill the combination of a column, a radial arm, an elevating mechanism for the arm, a clamp for locking the arm to the column, a rod on the arm adapted for movement to actuate the clamp, a head movable along the arm and having said rod extending therethrough, a traverse mechanism for the head, means on the head for selectively actuating the elevating mechanism and the traverse mechanism and an interlock operable on the rod whereby the clamp is locked when the traverse mechanism is operative and released when the elevating mechanism is operative.

4. A head and arm control for a radial drill comprising the combination with a vertically movable arm and a head traversable thereon of a power shaft, a drive shaft disposed at an angle thereto, spaced bevel gears rotatably mounted on the power shaft, a bevel gear on the drive shaft meshing with said first mentioned bevel gears, a double friction clutch member splined on the power shaft and slidable in opposite directions to frictional driving contact with the bevel gears whereby the drive shaft is selectively driven in opposite directions for raising and lowering the arm and moving the head on the arm and a power actuated tool spindle carried by the head and independently controllable.

In testimony whereof, I have hereunto subscribed my name this 12th day of October, 1927.

WILLIAM C. DE ROO.